United States Patent
Chen

(10) Patent No.: US 9,231,470 B2
(45) Date of Patent: Jan. 5, 2016

(54) CONTROL CIRCUIT, TIME CALCULATING UNIT, AND OPERATING METHOD FOR CONTROL CIRCUIT

(71) Applicant: uPI Semiconductor Corporation, Zhubei, Hsinchu County (TW)

(72) Inventor: Wei-Ling Chen, Zhubei (TW)

(73) Assignee: UPI SEMICONDUCTOR CORPORATION, Zhubei, Hsinchu County (TW)

( * ) Notice: Subject to any disclaimer, the term of this patent is extended or adjusted under 35 U.S.C. 154(b) by 322 days.

(21) Appl. No.: 13/803,102

(22) Filed: Mar. 14, 2013

(65) Prior Publication Data

US 2014/0055106 A1 Feb. 27, 2014

(30) Foreign Application Priority Data

Aug. 21, 2012 (TW) ............................. 101130319 A

(51) Int. Cl.
*H02M 3/156* (2006.01)
*H02M 1/00* (2007.01)

(52) U.S. Cl.
CPC ................ *H02M 3/156* (2013.01); *H02M 1/00* (2013.01); *H02M 2001/0016* (2013.01); *H02M 2003/1566* (2013.01)

(58) Field of Classification Search
CPC ............. H02M 2001/0016; H02M 2001/0022; H02M 3/155; H02M 3/156; H02M 2003/1566
See application file for complete search history.

(56) References Cited

U.S. PATENT DOCUMENTS

| | | | |
|---|---|---|---|
| 6,815,939 B2 | 11/2004 | Umemoto et al. | |
| 7,233,134 B2 * | 6/2007 | Huang et al. | 323/284 |
| 7,714,547 B2 | 5/2010 | Fogg et al. | |
| 8,022,680 B2 | 9/2011 | Ryoo | |
| 2008/0030181 A1 * | 2/2008 | Liu et al. | 323/283 |
| 2011/0304308 A1 * | 12/2011 | Wan et al. | 323/288 |
| 2012/0049821 A1 | 3/2012 | Hashiguchi et al. | |
| 2012/0268088 A1 * | 10/2012 | Lee et al. | 323/271 |
| 2012/0306586 A1 * | 12/2012 | Wan et al. | 332/109 |
| 2013/0063102 A1 * | 3/2013 | Chen | 323/234 |
| 2013/0300392 A1 * | 11/2013 | Laur et al. | 323/284 |
| 2013/0335046 A1 * | 12/2013 | Huang | 323/282 |
| 2014/0002047 A1 * | 1/2014 | Houston et al. | 323/283 |
| 2014/0070784 A1 * | 3/2014 | Lynch et al. | 323/283 |
| 2014/0103896 A1 * | 4/2014 | Lee et al. | 323/282 |
| 2014/0176091 A1 * | 6/2014 | Chiang et al. | 323/234 |
| 2014/0266122 A1 * | 9/2014 | Zhu et al. | 323/284 |

FOREIGN PATENT DOCUMENTS

CN 102386770 A 3/2012
TW I278169 4/2007

OTHER PUBLICATIONS

Taiwan Office Action dated Jun. 25, 2014.

* cited by examiner

*Primary Examiner* — Fred E Finch, III
(74) *Attorney, Agent, or Firm* — McClure, Qualey & Rodack, LLP

(57) ABSTRACT

A control circuit, a time calculating unit, and operating method for control circuit are disclosed. The control circuit is operated in a power converter and coupled to a load. The control circuit includes an output stage and a time calculating unit. The time calculating unit receives a control signal and a reference voltage and provides a switch conducting signal to the output stage. The generation of the control signal is related to an output voltage of the power converter. When the difference between the control signal and the reference voltage becomes larger due to the change of the load, the time calculating unit dynamically increases an on-time of the switch conducting signal.

16 Claims, 6 Drawing Sheets

30

CONTROL CIRCUIT, TIME CALCULATING UNIT, AND OPERATING METHOD FOR CONTROL CIRCUIT

BACKGROUND OF THE INVENTION

1. Field of the Invention

The invention relates to a DC-DC converter; in particular, to a control circuit, a time calculating unit, and a control circuit operating method operated in a power converter.

2. Description of the Prior Art

In general, in order to speed up the load transient variation of the power converter, the on-time of the switch conducting signal (the width of the pulse signal) will be fixedly enlarged twice or several times. For example, as shown in FIG. 1, when the load increases to heavy-loaded from light-loaded, the output inductor current $I_L$ becomes high-level from low-level. The on-time of the switch conducting signal UG (the width of the pulse signal) is enlarged 3 times from original Ton to 3 Ton to recover the rapidly declined feedback voltage FB as soon as possible. FIG. 2 illustrates a schematic diagram of the control logic circuit. As shown in FIG. 2, the comparator 20 outputs a pulse width modulation offset signal PWM_offset to switch the switch 40 to generate the switch conducting signal having 3 times width than the original one.

When a designer designs this system, he/she can determine the width magnification of the pulse signal; however, in practical applications, this default magnification is fixed instead of being dynamically adjusted with different loads, therefore, it lacks of flexibility to use. In addition, the switching between 1 time width and several times width is controlled by the pulse width modulation offset signal PWM_offset outputted by the comparator 20, however, since this offset is not fixed, it is hard to accurately determine whether the switch 40 should be switched. Therefore, it is not easy to control and has poor performance.

Therefore, the invention provides a control circuit, a time calculating unit, and a control circuit operating method operated in a power converter to solve the above-mentioned problems occurred in the prior arts.

SUMMARY OF THE INVENTION

A scope of the invention is to provide a control circuit. In a preferred embodiment, the control circuit is operated in a power converter and coupled to a load. The control circuit includes an output stage and a time calculating unit. The time calculating unit is coupled to the output stage. The time calculating unit is used for receiving a control signal and a reference voltage and providing a switch conducting signal to the output stage, wherein the control signal is generated related to an output voltage of the power converter. When a difference between the control signal and the reference voltage becomes larger due to a change of the load, the time calculating unit dynamically increases an on-time of the switch conducting signal.

In an embodiment, the time calculating unit includes a first current source, a current mirror, an operational amplifier, a comparator, a capacitor, and a switch. The current mirror includes a first transistor and a second transistor. The first current source is coupled between the first transistor and a ground terminal The capacitor is coupled between the second transistor and the ground terminal Two terminals of the switch are coupled to two sides of the capacitor respectively. The operational amplifier and the comparator are both coupled to a node between the second transistor and the capacitor.

In an embodiment, the first current source is related to an input voltage of the power converter. The first current source provides a first current to charge the capacitor through the current mirror. The operational amplifier is a voltage-to-current device used to receive the control signal and the reference voltage and selectively generate a second current source. The comparator receives a charging voltage of the capacitor and the output voltage of the power converter and outputs the switch conducting signal. When the charging voltage is higher than the output voltage, the comparator will stop outputting the switch conducting signal.

In an embodiment, the time calculating unit includes a first current source, an operational amplifier, and a capacitor. The first current source provides a first current. When the control signal is larger than the reference voltage, the operational amplifier generates a second current source. The first current is a sum of a second current of the second current source and a charging current flowing through the capacitor. When the load becomes larger, the control signal is increased and the difference between the control signal and the reference voltage also becomes larger accordingly. The second current of the second current source generated by the operational amplifier becomes larger and the charging current becomes smaller to cause the on-time of the switch conducting signal become longer.

In an embodiment, when the load becomes heavy-loaded from light-loaded, the operational amplifier linearly increases the second current of the second current source according to the difference between the control signal and the reference voltage to linearly increase the on-time of the switch conducting signal.

Another scope of the invention is to provide a time calculating unit. The time calculating unit is operated in a power converter and coupled to a load. The power converter includes an output stage. The time calculating unit includes a current mirror, a capacitor, a first current source, an operational amplifier, and a comparator. The capacitor is coupled between the current mirror and a ground terminal The first current source is coupled between the current mirror and the ground terminal and used for providing a first current to charge the capacitor through the current mirror. The operational amplifier is coupled to a node between the current mirror and the capacitor and used for receiving a control signal and a reference voltage, wherein the control signal is generated related to an output voltage of the power converter. The comparator is coupled to the operational amplifier, the current mirror, the capacitor, and the output stage and used for providing a switch conducting signal to the output stage. When a difference between the control signal and the reference voltage becomes larger due to a change of the load, the comparator dynamically increases an on-time of the switch conducting signal.

Another scope of the invention is to an operating method for a control circuit. In a preferred embodiment, the control circuit is operated in a power converter and coupled to a load. The operating method includes following steps of: (a) receiving a control signal and a reference voltage and providing a switch conducting signal to the output stage, wherein the control signal is generated related to an output voltage of the power converter; and (b) dynamically increasing an on-time of the switch conducting signal when a difference between the control signal and the reference voltage becomes larger due to a change of the load.

Compared to the prior arts, the control circuit, time calculating unit, and control circuit operating method operated in the power converter of the invention dynamically adjusts the on-time of the switch conducting signal in a linear way according to the variation of the load. Therefore, when the load becomes heavy-loaded from light-loaded, the transient response speed to the load will be faster and any load changing situations can be adapted. Furthermore, compared to the digital dichotomy used in the conventional power converter, it is more accurate that the power converter of the invention uses analog amplifier to determine how to change the on-time of the switch conducting signal (the width of the pulse signal). During the load transient changing process, the on-time of the switch conducting signal is still controlled by the loop to maintain the system stability.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is a control circuit operated in a power converter. In fact, the control circuit of the embodiment of the invention can be applied to a fixed frequency DC-DC converter or a constant-on-time (COT) DC-DC converter, but not limited to these. The control circuit of the invention can be applied to other power converter circuit structures, such as an AC-DC converter or a Dc-AC converter.

Figure 1:
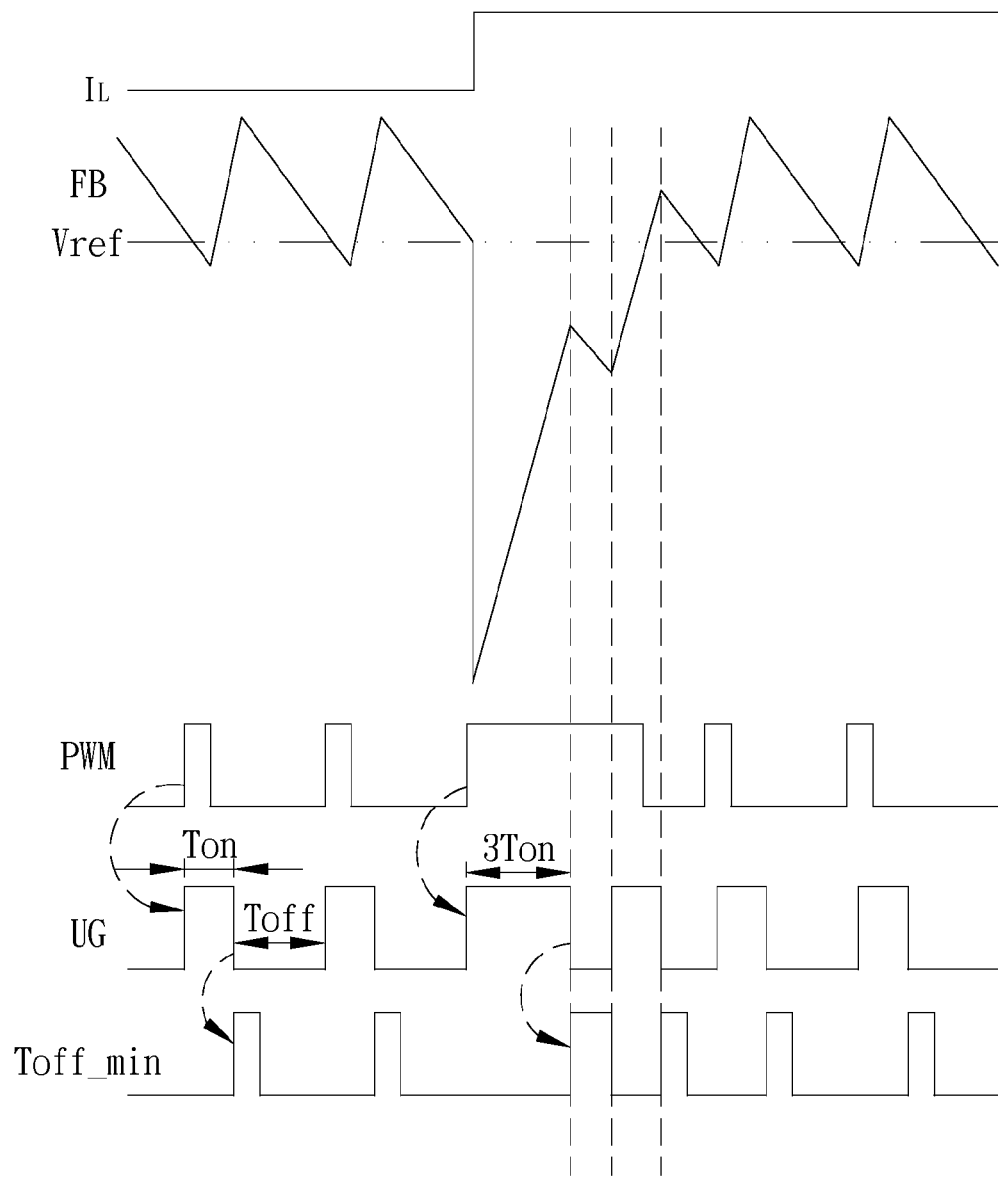
FIG. 1 illustrates timing diagrams of the signals in the conventional control circuit when the load becomes heavy-loaded from light-loaded.
Figure 2:
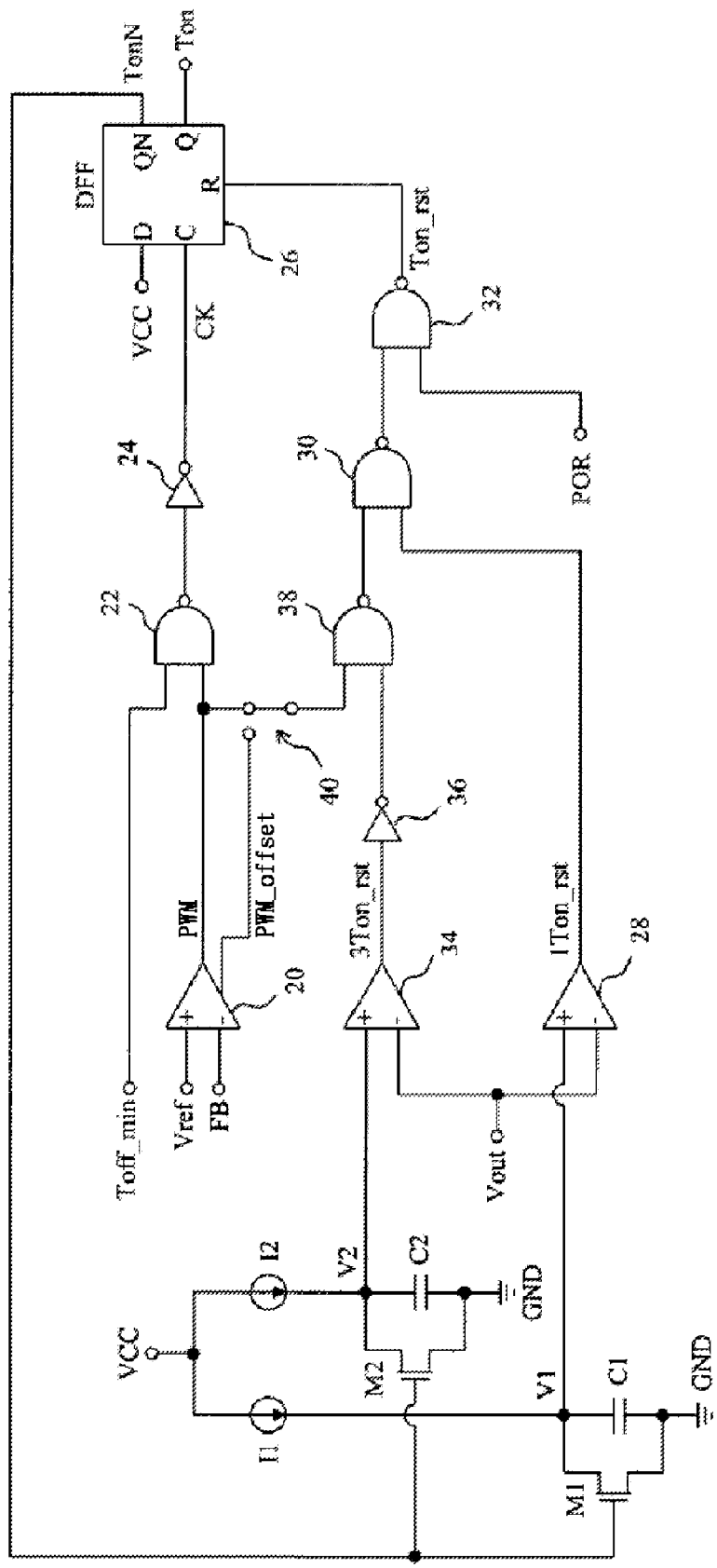
FIG. 2 illustrates a circuit structure schematic diagram of the conventional control circuit.
Figure 3:
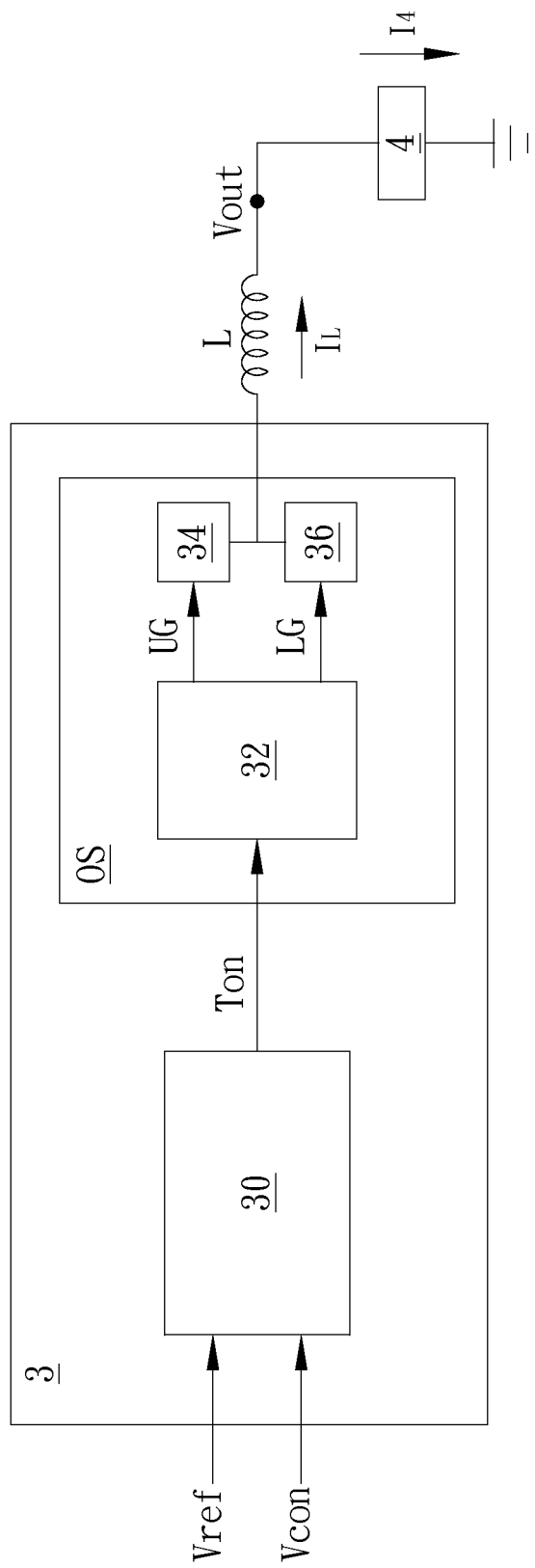
FIG. 3 illustrates a functional block diagram of the control circuit in an embodiment of the invention.

At first, please refer to FIG. 3. FIG. 3 illustrates a circuit structure schematic diagram of the control circuit operated in the power converter of this embodiment. As shown in FIG. 3, the control circuit 3 is coupled to a load 4 via the output inductor L. The control circuit 3 includes an output stage OS and a time calculating unit 30. The time calculating unit 30 is coupled to the output stage OS. The time calculating unit 30 receives a control signal $V_{con}$ and a reference voltage $V_{ref}$ and selectively provides a switch conducting signal $T_{on}$ to the output stage OS according to the control signal $V_{con}$ and the reference voltage $V_{ref}$. The output stage OS includes a driver 32, a first switch 34, and a second switch 36. The output stage OS is coupled to the load 4 through an output inductor L. The driver 32 outputs switch conducting signals UG and LG to the first switch 34 and the second switch 36 respectively to switch the first switch 34 and the second switch 36 on. The current flowing through the output inductor L is an output inductor current $I_L$; the current flowing through the load 4 is a load current $I_4$; the voltage between the output inductor L and the load 4 is an output voltage $V_{out}$ of the power converter.

Figure 4:
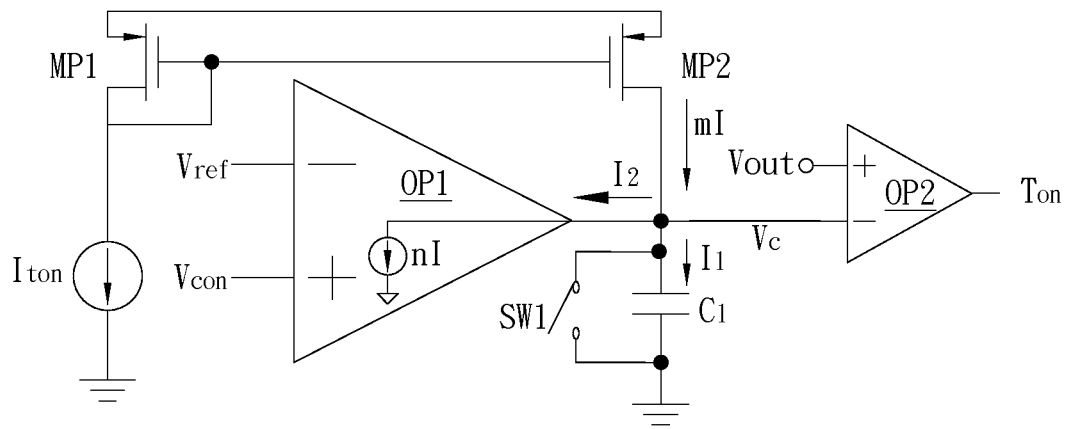
FIG. 4 illustrates a circuit structure schematic diagram of the time calculating unit shown in FIG. 3.

FIG. 4 illustrates a circuit structure schematic diagram of the time calculating unit 30 shown in FIG. 3. As shown in FIG. 4, the time calculating unit 30 includes a first current source $I_{ton}$, a first transistor MP1, a second transistor MP2, an operational amplifier OP1, a comparator OP2, a charging capacitor C1, and a charging switch SW1. The first current source $I_{ton}$ is coupled between the first transistor MP1 and a ground terminal; the first transistor MP1 and the second transistor MP2 are coupled relative to each other to form a current mirror; the charging capacitor C1 is coupled between the second transistor MP2 and the ground terminal; two terminals of the charging switch SW1 are coupled to two sides of the charging capacitor C1; the operational amplifier OP1 and the comparator OP2 are coupled to a node between the second transistor MP2 and the charging capacitor C1.

The first current source $I_{ton}$ is a function of the input voltage $V_{in}$ of the power converter. That to say, the first current source $I_{ton}$ provides a first current mI to charge the charging capacitor C1 through the current mirror formed by the first transistor MP1 and the second transistor MP2. At this time, the charging switch SW1 is open, so that the first current mI can flow to the charging capacitor C1 to charge the charging capacitor C1. The comparator OP2 compares the charging voltage $V_c$ of the charging capacitor C1 with the output voltage $V_{out}$ of the power converter. When the charging capacitor C1 is charged and the charging voltage $V_c$ of the charging capacitor C1 is higher than the output voltage $V_{out}$ of the power converter, namely the comparison result obtained by the comparator OP2 is that the charging voltage $V_c$ is higher than the output voltage $V_{out}$, it means that the charging process is done, the comparator OP2 will stop outputting the switch conducting signal $T_{on}$ to the output stage OS, and the charging switch SW1 will be switched on to make the first current mI flow to the ground terminal through the charging switch SW1 to stop the first current mI charging the charging capacitor C1.

In this embodiment, since the operational amplifier OP1 receives two voltage signals (the control signal $V_{con}$ and the reference voltage $V_{ref}$) and selectively generates a second current source nI according to the control signal $V_{con}$ and the reference voltage $V_{ref}$, the operational amplifier OP1 is a voltage-to-current circuit device. The operational amplifier OP1 compares the control signal $V_{con}$ with the reference voltage $V_{ref}$ and calculates a difference between the control signal $V_{con}$ and the reference voltage $V_{ref}$. In fact, the control signal $V_{con}$ can be an error signal (comp) obtained by comparing the output voltage $V_{out}$ of the power converter with a default voltage or a feedback signal (Vfb) related to the output voltage $V_{out}$ of the power converter, but not limited to these.

When the comparison result obtained by the operational amplifier OP1 is that the control signal $V_{con}$ is smaller than or equal to the reference voltage $V_{ref}$, the operational amplifier OP1 will not generate the second current source nI, namely the second current $I_2$ of the second current source nI is 0. At this time, the charging current $I_1$ flowing through the charging capacitor C1 equals to the first current mI.

When the comparison result obtained by the operational amplifier OP1 is that the control signal $V_{con}$ is larger than the reference voltage $V_{ref}$, the operational amplifier OP1 will start to generate the second current source nI, namely the second current $I_2$ of the second current source nI is larger than 0. At this time, the second current $I_2$ is a part of the first current mI flowing toward the second current source nI. That is to say, the first current mI equals to a sum of the second current $I_2$ and the charging current $I_1$. Therefore, the charging current $I_1$ flowing through the charging capacitor C1 is smaller than the first current mI.

Because the reference voltage $V_{ref}$ is a fixed value, once the control signal $V_{con}$ becomes larger, the difference between the control signal $V_{con}$ and the reference voltage $V_{ref}$ will also become larger accordingly. The operational amplifier OP1 will adjust the second current $I_2$ of the second current source nI according to the difference between the control signal $V_{con}$ and the reference voltage $V_{ref}$. When the difference between the control signal $V_{con}$ and the reference voltage $V_{ref}$ becomes larger, the second current $I_2$ of the second current source nI generated by the operational amplifier OP1 will also become larger and the charging current $I_1$ charging to the charging capacitor C1 will become smaller, so that the time needed for the charging current $I_1$ to charge the charging capacitor C1 to the charging voltage $V_c$ higher than the output voltage $V_{out}$ of the power converter will become longer. Therefore, the on-time from the time to start to output the switch conducting signal $T_{on}$ to the output stage OS to the time to stop outputting the switch conducting signal $T_{on}$ to the output stage OS becomes longer (namely the pulse width of the switch conducting signal $T_{on}$ becomes larger).

Figure 5:
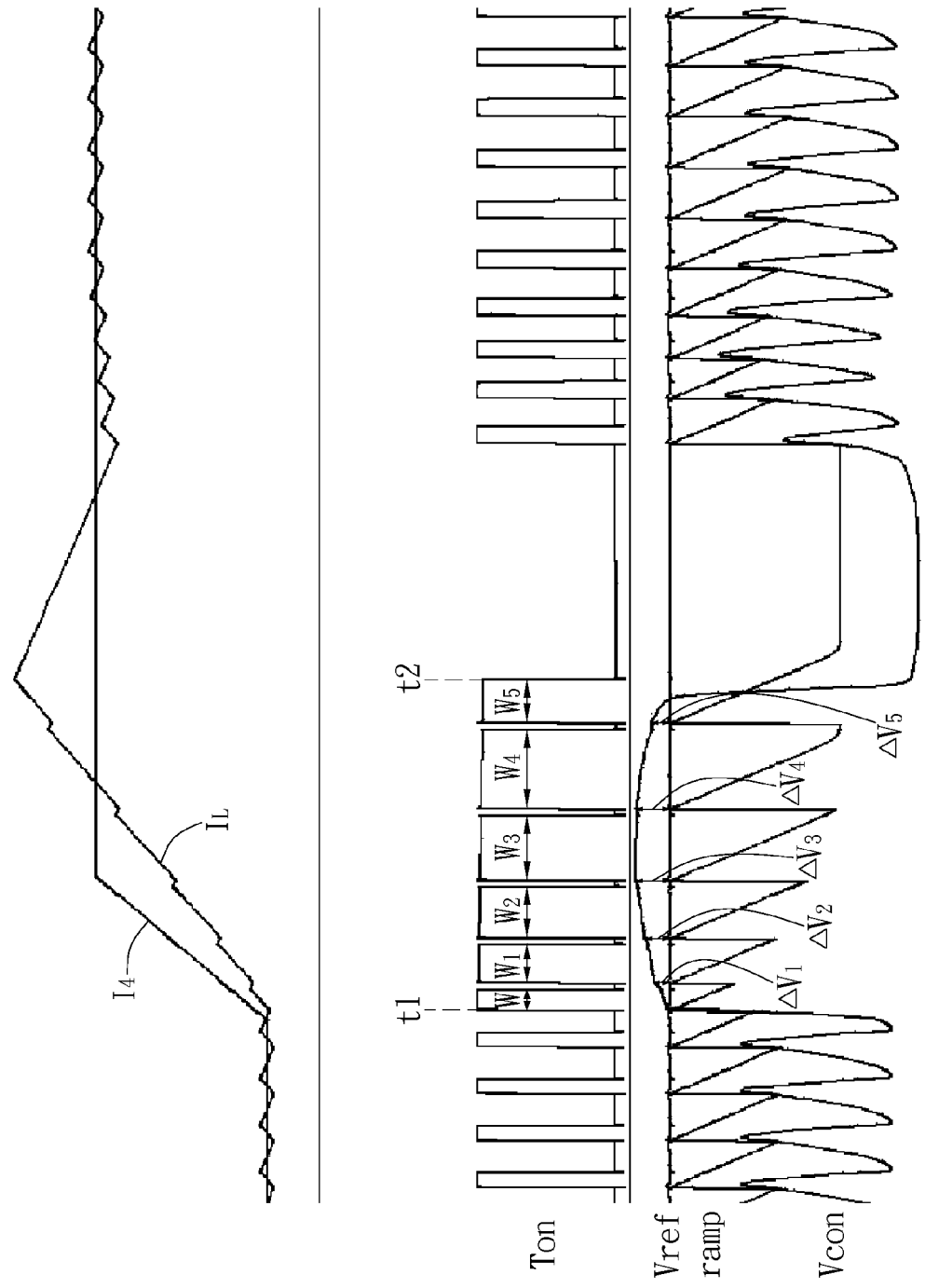
FIG. 5 illustrates timing diagrams of the signals in the control circuit shown in FIG. 3 when the load becomes heavy-loaded from light-loaded.

FIG. 5 illustrates timing diagrams of the signals when the load 4 becomes heavy-loaded from light-loaded. As shown in FIG. 5, when the load 4 generates transient change at time t1 (namely the load 4 becomes heavy-loaded from light-loaded), the load current $I_4$ and the output inductor current $I_L$ will be changed from the low-level to the high-level, so that the output voltage $V_{out}$ of the power converter will be increased and the control signal $V_{con}$ related to the output voltage $V_{out}$ will be also increased accordingly. Once the control signal $V_{con}$ is larger than the reference voltage $V_{ref}$, the operational amplifier OP1 will generate the second current $I_2$ of the second current source nI according to the difference between the control signal $V_{con}$ and the reference voltage $V_{ref}$, so that the charging current $I_1$ flowing through the charging capacitor C1 is smaller than the first current mI. Therefore, the time needed for the charging current $I_1$ to charge the charging capacitor C1 to the charging voltage $V_c$ higher than the output voltage $V_{out}$ of the power converter becomes longer; that is to say, the on-time of the switch conducting signal $T_{on}$ becomes longer.

During the period of the time t1 to the time t2, the control signal $V_{con}$ is increased to over the reference voltage $V_{ref}$, the operational amplifier OP1 will generate the second current $I_2$ of the second current source nI and linearly adjust the second current $I_2$ of the second current source nI according to the difference between the control signal $V_{con}$ and the reference voltage $V_{ref}$ to linearly adjust the on-time of the switch conducting signal $T_{on}$ (namely the pulse width of the switch conducting signal $T_{on}$).

After the control signal $V_{con}$ is increased to over the reference voltage $V_{ref}$, if the control signal $V_{con}$ is continuously increased, the difference between the control signal $V_{con}$ and the reference voltage $V_{ref}$ is gradually increased from 0 to $\Delta V_4$; therefore, the on-time (namely the pulse width) of the corresponding switch conducting signal $T_{on}$ is also increased from W to $W_4$. When the control signal $V_{con}$ is decreased, the difference between the control signal $V_{con}$ and the reference voltage $V_{ref}$ will be decreased from $\Delta V_4$ to $\Delta V_5$. Therefore, the on-time (namely the pulse width) of the corresponding switch conducting signal $T_{on}$ is also decreased from $W_4$ to $W_5$.

By doing so, the control circuit 3 can speed up the transient response speed to the load 4 and dynamically adjust the on-time (namely the pulse width) of the corresponding switch conducting signal $T_{on}$ to $W_1 \sim W_5$ according to the differences $\Delta V_1 \sim \Delta V_5$ between the control signal $V_{con}$ and the reference voltage $V_{ref}$. Therefore, it can adapt any load 4 changing situations to effectively improve the drawbacks of the prior arts including that the fixed pulse magnification used in the prior arts is failed to be dynamically adjusted with different loads and that it is hard to accurately determine when to start to output the switch conducting signal $T_{on}$ or to stop outputting the switch conducting signal $T_{on}$.

Figure 6:
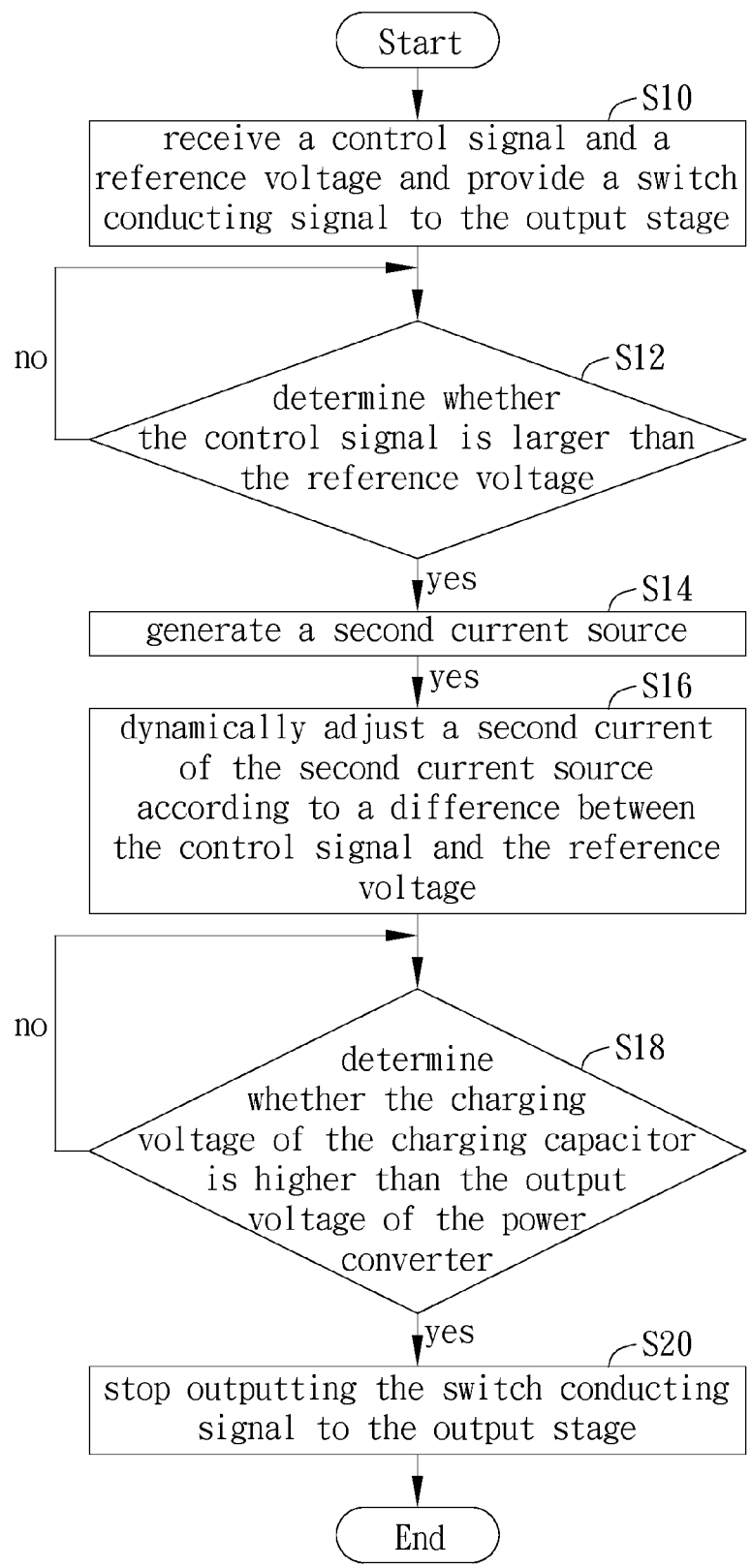
FIG. 6 illustrates a flowchart of the control circuit operating method in another embodiment of the invention.

Another preferred embodiment of the invention is an operating method for a control circuit. In this embodiment, the control circuit is operated in a power converter and coupled to a load. The control circuit includes an output stage. Please refer to FIG. 6. FIG. 6 illustrates a flowchart of the operating method for the control circuit in this embodiment.

As shown in FIG. 6, at first, the method performs the step S10 to receive a control signal and a reference voltage and provide a switch conducting signal to the output stage, wherein the control signal is generated related to an output voltage of the power converter. In fact, the control signal can be an error signal obtained by comparing the output voltage of the power converter with a reference voltage or a feedback signal related to the output voltage of the power converter, but not limited to this.

Next, the method performs the step S12 to determine whether the control signal is larger than the reference voltage. If the determining result of the step S12 is yes, it means that the control signal is increased over the fixed reference voltage; therefore, the method will perform the step S14 to generate a second current source and the step S16 to dynamically adjust a second current of the second current source according to a difference between the control signal and the reference voltage. When the loading becomes heavy-loaded from light-loaded, the output voltage of the power converter will be increased and the control signal related to the output voltage of the power converter will be also increased, so that the difference between the control signal and the reference voltage will be increased. Therefore, the method dynamically increases the second current of the second current source according to the increased difference between the control signal and the reference voltage Then, the method performs the step S18 to determine whether the charging voltage of the charging capacitor is higher than the output voltage of the power converter. If the determining result of the step S18 is yes, it means that the charging capacitor has been charged by the charging current to the charging voltage higher than the output voltage of the power converter. Therefore, the method performs the step S20 to stop outputting the switch conducting signal to the output stage.

It should be noticed that when the load becomes heavy-loaded from light-loaded, the second current of the second current source becomes larger and the charging current flowing through the charging capacitor becomes smaller, so that the time needed for the charging current to charge the charging capacitor to the charging voltage higher than the output voltage of the power converter becomes longer. Therefore, the on-time from the time to start to output the switch conducting signal to the output stage to the time to stop outputting the switch conducting signal to the output stage becomes longer (namely the pulse width of the switch conducting signal becomes larger).

Compared to the prior arts, the control circuit, time calculating unit, and control circuit operating method operated in the power converter of the invention dynamically adjusts the on-time of the switch conducting signal in a linear way according to the variation of the load. Therefore, when the load becomes heavy-loaded from light-loaded, the transient response speed to the load will be faster and any load changing situations can be adapted. Furthermore, compared to the digital dichotomy used in the conventional power converter, it is more accurate that the power converter of the invention uses analog amplifier to determine how to change the on-time of the switch conducting signal (the width of the pulse signal).

During the load transient changing process, the on-time of the switch conducting signal is still controlled by the loop to maintain the system stability.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A control circuit, operated in a power converter and coupled to a load, the control circuit comprising:
   an output stage; and
   a time calculating unit, coupled to the output stage, for receiving a control signal and a reference voltage and providing a switch conducting signal to the output stage; wherein the control signal is generated related to an output voltage of the power converter; when a difference between the control signal and the reference voltage becomes larger due to a change of the load, the time calculating unit dynamically increases an on-time of the switch conducting signal, the time calculating unit comprises a first current source, an operational amplifier, and a capacitor, the first current source provides a first current; when the control signal is larger than the reference voltage, the operational amplifier generates a second current source; the first current is a sum of a second current of the second current source and a charging current flowing through the capacitor.

2. The control circuit of claim 1, wherein the time calculating unit comprises a first current source, a current mirror, an operational amplifier, a comparator, a capacitor, and a switch, the current mirror includes a first transistor and a second transistor, the first current source is coupled between the first transistor and a ground terminal, the capacitor is coupled between the second transistor and the ground terminal, two terminals of the switch are coupled to two sides of the capacitor respectively, the operational amplifier and the comparator are both coupled to a node between the second transistor and the capacitor.

3. The control circuit of claim 2, wherein the first current source is related to an input voltage of the power converter, the first current source provides a first current to charge the capacitor through the current mirror, the operational amplifier is a voltage-to-current device used to receive the control signal and the reference voltage and selectively generate a second current source, the comparator receives a charging voltage of the capacitor and the output voltage of the power converter and outputs the switch conducting signal when the charging voltage is larger than the output voltage, the comparator stops outputting the switch conducting signal.

4. The control circuit of claim 1, wherein when the load becomes larger, the control signal is increased and the difference between the control signal and the reference voltage also becomes larger accordingly, the second current of the second current source generated by the operational amplifier becomes larger and the charging current becomes smaller to cause the on-time of the switch conducting signal become longer.

5. The control circuit of claim 4, wherein when the load becomes heavy-loaded from light-loaded, the operational amplifier linearly increases the second current of the second current source according to the difference between the control signal and the reference voltage to linearly increase the on-time of the switch conducting signal.

6. A time calculating unit, operated in a power converter and coupled to a load, the power converter comprising an output stage, the time calculating unit comprising:
   a current mirror;
   a capacitor, coupled between the current mirror and a ground terminal;
   a first current source, coupled between the current mirror and the ground terminal, for providing a first current to charge the capacitor through the current mirror;
   an operational amplifier, coupled to a node between the current mirror and the capacitor, for receiving a control signal and a reference voltage, wherein the control signal is generated related to an output voltage of the power converter; and
   a comparator, coupled to the operational amplifier, the current mirror, the capacitor, and the output stage, for providing a switch conducting signal to the output stage;
   wherein when a difference between the control signal and the reference voltage becomes larger due to a change of the load, the comparator dynamically increases an on-time of the switch conducting signal; the operational amplifier is a voltage-to-current device used to receive the control signal and the reference voltage and selectively generate a second current source; the comparator receives a charging voltage of the capacitor and the output voltage of the power converter and outputs the switch conducting signal.

7. The time calculating unit of claim 6, wherein the current mirror includes a first transistor and a second transistor, the time calculating unit comprises a switch, and two terminals of the switch are coupled to two sides of the capacitor respectively, the first current source is related to an input voltage of the power converter.

8. The time calculating unit of claim 6, wherein when the charging voltage is larger than the output voltage, the comparator stops outputting the switch conducting signal.

9. The time calculating unit of claim 8, wherein when the control signal is larger than the reference voltage, the operational amplifier generates a second current source, the first current is a sum of a second current of the second current source and a charging current flowing through the capacitor; when the load becomes larger, the control signal is increased and the difference between the control signal and the reference voltage also becomes larger accordingly, the second current of the second current source becomes larger and the charging current becomes smaller to cause the on-time of the switch conducting signal become longer.

10. The time calculating unit of claim 9, wherein when the load becomes heavy-loaded from light-loaded, the operational amplifier linearly increases the second current of the second current source according to the difference between the control signal and the reference voltage to linearly increase the on-time of the switch conducting signal.

11. An operating method for a control circuit operated in a power converter and coupled to a load, the control circuit comprising an output stage, the operating method comprising following steps of:
   (a) receiving a control signal and a reference voltage and providing a switch conducting signal to the output stage, wherein the control signal is generated related to an output voltage of the power converter; and
   (b) dynamically increasing an on-time of the switch conducting signal when a difference between the control signal and the reference voltage becomes larger due to a change of the load;

wherein the control circuit further comprises a first current source and a capacitor, the first current source provides a first current to charge the capacitor, the step (a) comprises following steps of:
(a1)) comparing the control signal with the reference voltage;
(a2) selectively generating a second current source according to a comparison result of the step (a1); and
(a3) comparing a charging voltage of the capacitor with the output voltage of the power converter.

12. The operating method of claim 11, wherein the step (a) further comprises:
(a4) providing the switch conducting signal to the output stage according to a comparison result of the step (a3).

13. The operating method of claim 12, wherein when the comparison result of the step (a3) is that the charging voltage is larger than the output voltage, the operating method performs the step (a4) to stop outputting the switch conducting signal to the output stage.

14. The operating method of claim 12, wherein when the comparison result of the step (a1) is that the control signal is larger than the reference voltage, the operating method performs the step (a2) to generate the second current source according to the difference between the control signal and the reference voltage, the first current is a sum of a second current of the second current source and a charging current flowing through the capacitor.

15. The operating method of claim 14, wherein when the load becomes larger, the control signal is increased and the difference between the control signal and the reference voltage also becomes larger accordingly, the second current of the second current source generated in the step (a2) becomes larger and the charging current becomes smaller to cause the on-time of the switch conducting signal become longer.

16. The operating method of claim 14, wherein when the load becomes heavy-loaded from light-loaded, the operational amplifier linearly increases the second current of the second current source according to the difference between the control signal and the reference voltage to linearly increase the on-time of the switch conducting signal.

\* \* \* \* \*